US006397040B1

(12) United States Patent
Titmuss et al.

(10) Patent No.: US 6,397,040 B1
(45) Date of Patent: May 28, 2002

(54) TELECOMMUNICATIONS APPARATUS AND METHOD

(75) Inventors: Richard John Titmuss; Katherin Margaret Allen; Caroline Anne Michele Lebre, all of Ipswich; Robert Peter Moore, Suffolk, all of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/125,708

(22) PCT Filed: Apr. 9, 1998

(86) PCT No.: PCT/GB98/01056

§ 371 (c)(1),
(2), (4) Date: Aug. 25, 1998

(87) PCT Pub. No.: WO98/47295

PCT Pub. Date: Oct. 27, 1998

(30) Foreign Application Priority Data

Apr. 14, 1997 (GB) .............................................. 9707615

(51) Int. Cl.$^7$ ................................................. H04Q 7/20
(52) U.S. Cl. ...................... 455/67.1; 455/456; 455/414; 455/457; 455/412; 342/357
(58) Field of Search ................................. 455/456, 414, 455/517, 525, 38.1, 403, 558, 550, 552, 422, 67.1, 431, 412, 457; 342/357

(56) References Cited

U.S. PATENT DOCUMENTS

| | | | |
|---|---|---|---|
| 5,515,426 A | * 5/1996 | Yacenda et al. | ............ 455/456 |
| 5,539,924 A | 7/1996 | Grube et al. | ................ 455/456 |
| 5,561,704 A | 10/1996 | Salimando | .................. 455/456 |
| 5,568,153 A | 10/1996 | Beliveau | ..................... 455/456 |
| 5,579,535 A | * 11/1996 | Orlen et al. | ................ 455/456 |

(List continued on next page.)

FOREIGN PATENT DOCUMENTS

| | | |
|---|---|---|
| DE | 1962 1424 | 12/1997 |
| GB | 2313257 A | 11/1997 |
| JP | 6-269044 | 9/1994 |
| JP | 9-9335 | 1/1997 |
| JP | 9-130861 | 5/1997 |
| JP | 10-164661 | 6/1998 |
| JP | 10-191453 | 7/1998 |
| WO | WO 98/19479 | 5/1998 |
| WO | WO 98/21913 | 5/1998 |

OTHER PUBLICATIONS

Exploring With Computers in Vikingland, AEDS–81 Convention Proceedings, May 5–8, 1981, pp. 162–164.
Documentaliste Sciences de L'Information, vol. 33, No. 1, 1996, pp. 33–39.
Information World Review, vol. 109, Dec. 1995, p. 28.
IEEE Infocom 1996 Proceedings, vol. 3, May 24–28, 1996, pp. 1388–1396.
Information Network and Data Communication, 1996, pp. 378–390.

(List continued on next page.)

Primary Examiner—William Trost
Assistant Examiner—Keith Ferguson
(74) Attorney, Agent, or Firm—Nixon & Vanderhye PC

(57) ABSTRACT

A method of selecting information sources from which information is provided to users via a telecommunications system, the method comprising: tracking the location of a user in the system by receipt of tracking information for the user; accessing location data indicating localities in which information from the respective sources is deemed to be relevant; generating a shortlist of information sources for the user on the basis of the tracking information and the location data; and transmitting the shortlist to a terminal associated with the user so as to allow the user to select an information source of interest and thereby to access information from the source.

44 Claims, 7 Drawing Sheets

U.S. PATENT DOCUMENTS

| | | | |
|---|---|---|---|
| 5,583,914 A | 12/1996 | Chang et al. | 455/456 |
| 5,602,901 A | 2/1997 | Redden et al. | 455/456 |
| 5,627,549 A * | 5/1997 | Park | 342/357 |
| 5,649,300 A | 7/1997 | Snyder et al. | 455/456 |
| 5,652,707 A | 7/1997 | Wortham | 455/456 |
| 5,678,194 A | 10/1997 | Grube et al. | 455/456 |
| 5,689,245 A | 11/1997 | Noreen et al. | 455/456 |
| 5,712,899 A | 1/1998 | Pace, II | 455/456 |
| 5,719,929 A | 2/1998 | Menard | 455/456 |
| 5,727,057 A | 3/1998 | Emery et al. | 455/456 |
| 5,740,538 A | 4/1998 | Joyce et al. | 455/456 |
| 5,754,955 A | 5/1998 | Ekbatani | 455/456 |
| 5,778,304 A | 7/1998 | Grube et al. | 455/456 |
| 5,797,091 A | 8/1998 | Clise et al. | 455/456 |
| 5,802,454 A | 9/1998 | Goshay et al. | 455/456 |
| 5,802,468 A | 9/1998 | Gallant et al. | 455/456 |
| 5,812,950 A | 9/1998 | Tom | 455/456 |
| 5,815,810 A | 9/1998 | Gallant et al. | 455/456 |
| 5,948,041 A * | 9/1999 | Abo et al. | 455/456 |
| 5,983,115 A | 11/1999 | Mizikovsky | 455/456 |
| 6,026,304 A * | 2/2000 | Hilsenrath et al. | 455/456 |
| 6,049,711 A * | 4/2000 | Ben-Yehezkel et al. | 455/456 |
| 6,178,335 B1 * | 1/2001 | Vu | 455/558 |

OTHER PUBLICATIONS

Multimedia Telecommunications and Applications, Third International COST 237 Workshop, Nov. 1996 pp. 104–129.

IEEE Infocom 1996 Proceedings, vol. 2, Mar. 24–28, 1996, pp. 464–472.

Rhodes et al. "Remembrance Agent: A Continuously Running Automated Information Retrieval System", Apr. 1996, pp. 487–496.

Starner et al., Wearable Computing and Augmented Reality, M.I.T. Media Lab Vision and Modeling Group Technical Report No. 355, Nov. 1995, pp. 1–19.

* cited by examiner

TELECOMMUNICATIONS APPARATUS AND METHOD

BACKGROUND OF THE INVENTION

1. Field of the Invention

This invention relates to telecommunications apparatus and method. More particularly, the invention relates to apparatus and methods for delivering information to mobile users in a telecommunications system.

2. Description of Related Art

In conventional telecommunications, a given user is associated with a given telecommunications terminal (e.g. a conventional telephone, or a computer with a modem, or a facsimile unit). However, more recently, users have become mobile. In addition to mobile telephones (for example digital cellular telephones such as those conforming to the GSM standard) other types of portable terminal include pagers (either tone pagers or message pagers which can receive short textual messages and display them); so called "personal digital assistants" (PDA's) and portable facsimile or computer units adapted to communicate via cellular networks using dedicated modems. Users may also move to and from fixed terminals.

At the same time, the volume and types of formats of information which can be transmitted is increasing, and new, so called "multi-media" formats, consisting of single sets of information presented in multiple media (such as for example image, text and audio files) are entering use.

The telecommunications channels through which information is delivered comprise channels of varying bandwidth, including optical fibre links; coaxial copper links; conventional subscriber telephone lines; infra-red local area networks; and radio frequency channels. Of these, radio frequency channels are used for mobile communications. However, radio frequency channels which are used in mobile communications generally have available the lowest bandwidth due to demands on the RF spectrum and to the channel conditions within the RF spectrum. Thus the amount of information which a mobile user can currently receive and select from is relatively limited.

European patent application EP-A-0718784 describes a system for retrieving information based on a user-defined profile. A server acting on behalf of the client identifies information on the basis of the user-defined profile, to generate a personalised newspaper which is delivered to the user. This provides for an automatic sorting of the large volume of data available on the World Wide Web to generate a subset of the information available which is tailored to a users specific interest. However, the system is only used for providing a personalised newspaper delivered in electronic form to a static user.

International patent publication No WO94/30023 describes a GSM telecommunications system whereby data records may be downloaded onto subscriber identity modules in the system by broadcasting the data to a subscriber. The distribution of messages to subscriber identity modules in a specific area is possible, for example for advertising purposes. However, only a limited amount of data can be broadcast in such a manner for storage on the subscriber identity modules. Furthermore, the information available to the user at any one time is available only from one source, for example a data server is connected to the local telephone exchange.

International patent publication No WO93/01665 describes a telecommunications system in which mobile users are able to receive localised information data from base stations in the system. Each base station is provided with a localised information database, containing information pertaining to the local area, which can be received by a mobile user being served by the base station on request. The user is able to download selected portions of the information contained in the localised information database by stating selections on a mobile terminal. However, again the amount of information available to the user is limited to that stored in the localised information database. Furthermore, all mobile users in a cell receive the same information, and the information is localised only to the extent that the base stations are separated.

International patent publication no. WO96/07110 describes a navigation information system whereby route guidance information, or possibly other locality-dependent information, may be provided to a user of a cellular telephone network. The user, on requesting service, identifies a destination, which a server specifically allocated to that user uses to formulate a route. As the user travels along the route, the cellular telephone of the users automatically signals tracking information to the server as the user travels. When the user's position falls within predefined "overlay areas", messages direct from the user along the route are automatically generated and transmitted the cellular telephone of the user. Whilst this document briefly describes providing other locality-dependent information, such as information about local facilities, tourist attractions, weather forecasts, public transport information, etc, the means of presentation of the information to the user is inconvenient, insofar as the amount of information presented, if a large variety of information were included, would be excessive.

BRIEF SUMMARY OF THE INVENTION

Our earlier international application PCT/GB96/00252, published Aug. 15, 1996, describes a multimedia telecommunications system employing reconfigurable agents. Aspects of this document are incorporated by reference herein.

Our earlier international application PCT/GB97/00890, published Oct. 9, 1997, describes a telecommunication system in which a user is tracked, and the identity of a terminal which he may at any time be using is stored. The capabilities (i.e. formats in which signals can be accepted and/or output) of terminal equipment in the vicinity of the user is stored. Therefore, rather than attempting (unsuccessfully) to deliver a high bandwidth signal to a low bandwidth mobile terminal, the system directs the signal to a nearby terminal which can support a better representation of the signal. The nearby terminal may accept and output the signal in its original form, or the network may convert the signal to a different format which can be accepted by the nearby terminal.

One aspect of the present invention provides a method of selecting information sources from which information is provided to users via a telecommunications system, said method comprising:

tracking the location of a user in the system by receipt of tracking information for said user;

accessing location data indicating localities in which information from the respective sources is deemed to be relevant;

generating a shortlist of information sources for said user on the basis of said tracking information and said location data; and transmitting said shortlist to a terminal associated with said user so as to allow said user to select an information source of interest and thereby to access information from said source.

Thus, the invention provides a system in which information specific to the location of the user may be shortlisted, thereby filtering out information which relates to other locations. This method provides a basis for various improvements to known information distribution systems.

Individual sets of information sources may be selected, and dynamically altered, for each user in the system, thereby providing for personalised information distribution which alters the information delivered dynamically in accordance with the location of each of the users.

The individual set of information sources may be further filtered with user-specific preference information pre-stored for each user.

Dual filtering, both according to the location of the user and in accordance with pre-stored preference information, can be used to provide particularly useful shortlists whereby the level of expected interest to a user of the information sources selected can be maintained at a high level, whilst nevertheless deriving information from a wide variety of sources.

According to a further aspect of the invention there is provided apparatus for collating information sources from which information is to be provided to users in a telecommunications system, said apparatus comprising:

location storage means arranged to store location data associated with said information sources held on one or more remote servers; and location-dependent selection means arranged to select, from said information sources, a plurality of information sources on the basis of intersections between locations specified by users and said location data Thus, the location data and selection functionality may be provided entirely separately from the information content, which may be stored on different servers. Integration with content from the World Wide Web is also possible, as the information sources may be held remotely.

Preference information may also be used to filter the information sources, and may also be held separately from the information content for security, for example on another server.

In accordance with a further aspect of the invention there is provided a method of distributing information to users in a telecommunications system, said method comprising:

tracking the location of a user by receipt of tracking information from a location updater part of said system;

selecting one or more information sources from which information is intended to be received in localities surrounding the location of the user, by means of said tracking information, in a location directory part of said system; and transmitting summary information and a system address for each of the selected information sources to a terminal part of said system, to allow the user to receive said summary information and access said information source via said terminal part.

This allows a user to be alerted to the availability of information relevant to the user's location and which may be of interest to the user, and to access the information if the summary indicates that it is in fact of interest.

BRIEF DESCRIPTION OF THE DRAWINGS

Further aspects, features and advantages of the present invention will be apparent from the following description of preferred embodiments of the invention, which refers to the accompanying drawings, in which.

DESCRIPTION OF THE INVENTION

General Overview of Physical Layer

Figure 1:
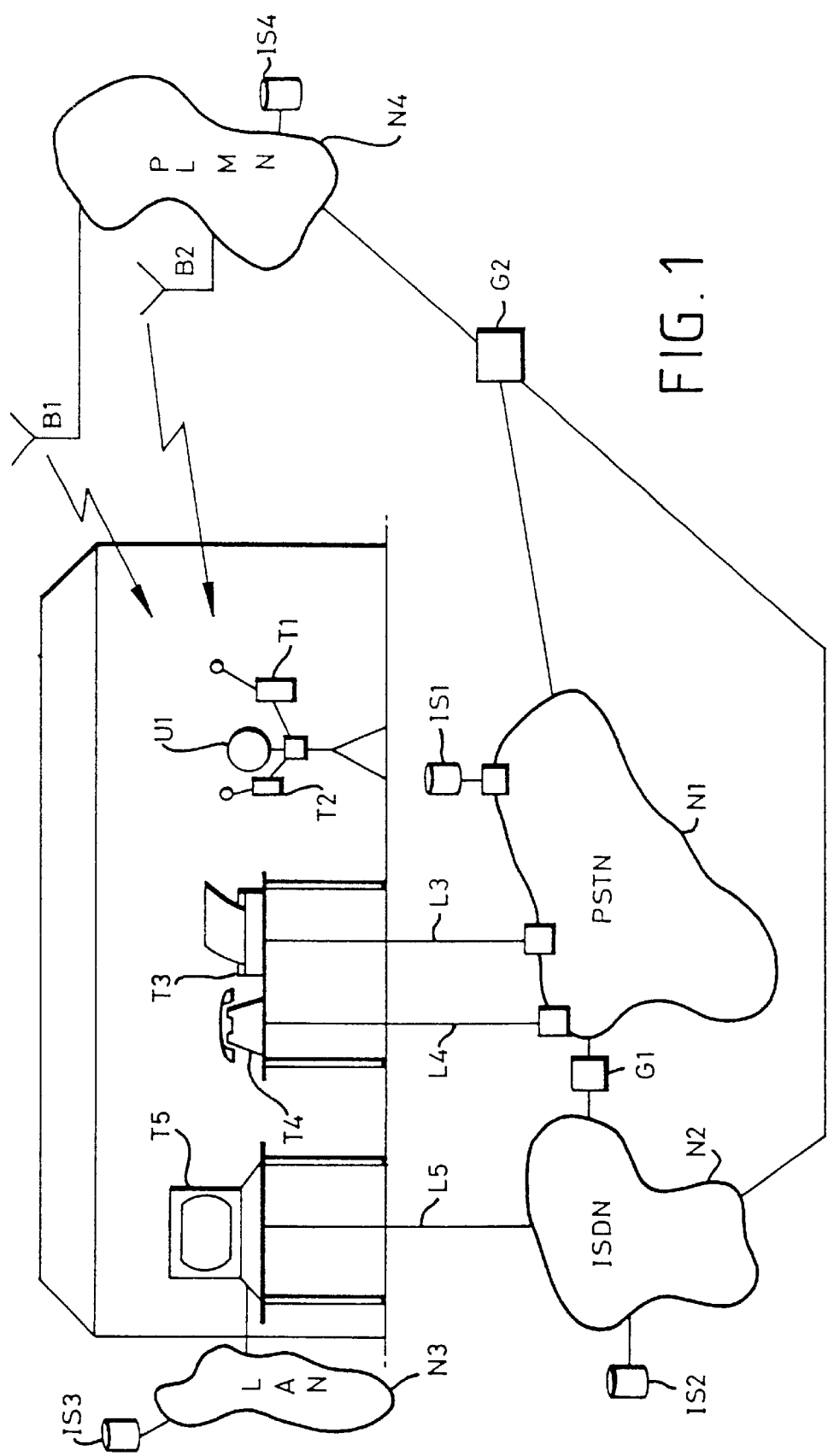
FIG. 1 is a schematic diagram illustrating the physical, or transport, layer of telecommunications system according to the invention.

Referring to FIG. 1, at the physical or bearer level the telecommunications environment of a user U1 comprises a cellular telephone T1 and a personal digital assistant T2 carried by the user; a facsimile apparatus T3 and conventional telephone T4 at a desk a few feet from the user; and a computer workstation T5 including a modem at a desk top some meters away from the user, all within a single building.

The workstation T5 in this case comprises a local area network (LAN) server, connected to further terminals T6–T9 (not shown) at different distances from the user.

The various terminals T1–T5 are each capable of receiving different signal formats, as follows:

T1—voice or low bit rate data
T2—low bit rate data (receive only).
T3—facsimile image signals.
T4—narrow bandwidth audio.
T5—high bit rate data in various formats.

In communication with the various terminals are a number of different communications channels forming parts of different notional networks (although some or all may be commonly owned).

A public switched telephone network (PSTN) N1 is connected via a local line L3 to terminal T3, and via local line L4 to terminal T4.

An integrated services digital network (ISDN) N2 is interconnected with the PSTN N1 via a gateway G1 (e.g. a local or international switching centre), and is connected via an ISDN line L5 to terminal T5, and hence to local area network N3.

A public land mobile network (PLMN) (e.g. a GSM-compatible digital cellular network) N4 is connected via a gateway G2 to the PSTN N1 and ISDN N2. A base station B1 of the PLMN provides a picocell in the environment of the building within which the user U1 is located, and a base station B2 provides a cell within the same general area.

Thus, the networks N1–N4 are capable of delivering data at different rates to the various terminal T1–T5; low speed data via the PLMN N4, higher speed data via the PSTN N1, and yet higher speed data via the ISDN N2 or LAIN N3.

Information sources, held for example on file servers IS1–IS4, are distributed throughout the networks N1–N4. Only four file servers are shown, however other distributions are envisaged. The user U1 wishes to receive pertinent information from any or all the information sources in the system.

The user U1 carries a tracking device via which his position within the telecommunications environment may be tracked. For example, in this embodiment the tracking device P1 comprises a chip carrying card or "smart card" carrying data identifying the user, and some or all of the terminals T1–T5 carrying a card reader arranged to read the card. Alternatively, it could comprise a 'smart badge' transponder, the location of which is tracked within the building.

Specifically, the workstations T5–T5 and the cellular telephone T1 carry such smart card readers. Additional smart card readers are installed at access doors within the building, and are connected to the LAN N3 to signal thereon.

Further, preferably, the cellphone T1 comprises, in addition to cellphone communicating components, a global positioning system (GPS) receiver and is arranged to derive and signal its position periodically as disclosed in EP 0467651 (Motorola). Alternatively, the cellphone T1 could perform positioning additionally using a land-based positioning signal, such as by differential GPS positioning, or purely using land-based positioning signals, such as differential GSM triangulation signals.

Thus, the position of the user U1 is known by one or more of several means; firstly, it is known to which terminal he has logged in, for example by password and/or by the insertion of his smart card; secondly, his geographical position is obtained by means of a positioning signal receiver; and thirdly, his position within a building may be known (from the access door system).

Figure 2:
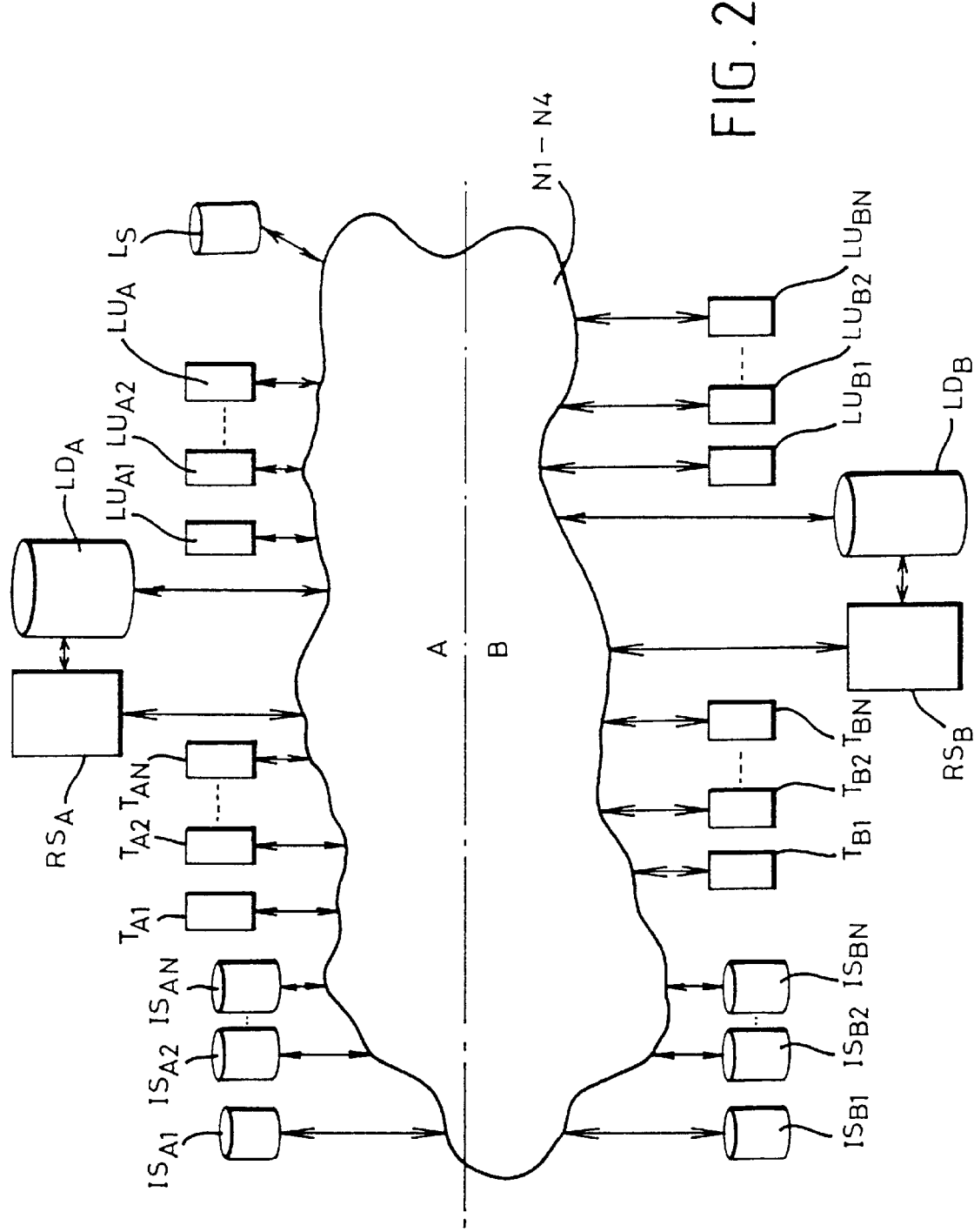
FIG. 2 is a schematic block diagram illustrating the components of the information delivery apparatus of the system of FIG. 1.

Referring to FIG. 2, the networks N1–N4 are divided into two geographical regions (A, B), in order to localise location updating signalling within each of the regions, thereby reducing the signalling load on the system. Only two regions are shown for the purposes of illustration. However, larger numbers of geographical regions are also possible. Also for the purposes of illustration, the following description will relate mainly to one of those geographical areas (A), although the characteristics of the information distribution procedures within other geographical regions will then be readily apparent.

Region A has a number of information sources $IS_{A1}$–$IS_{AN}$ available via the networks N1–N4, which provide information associated with various localities within the region. A number of terminals $T_{A1-TAN}$ are located within the region, the terminals including fixed terminals at various locations in the region, and mobile terminals which are at least temporarily within the region. The terminals have various technical characteristics, including different information type input and output formats.

A number of location update devices $LU_{A1}$–$LU_{AN}$ are located within the region. These location update devices include fixed terminals, such as the card readers previously referred to, which perform location updating for any users within their respective localities, and mobile terminals, such as the GPS receivers previously referred to, which are carried by a single user and perform location updating for that user alone.

Also included in the region is a regional server $RS_A$ which stores intelligent software agents, as discussed in further detail below. A key element of this embodiment is the regional location directory store $LD_A$. The location directory store $LD_A$ holds records of information sources, terminals and users which are present in its region. The regional location directory store $LD_A$ may be an element in a distributed hierarchical network of location directory stores.

Software System Architecture

For the reasons described in the above referenced prior art, it is advantageous to employ a so called "agent based" control mechanism. The term "agent" is used with a number of different senses in the literature; here, except where the context makes it clear that this is unnecessarily limiting, it will be understood to mean an independently executing control program under control of which a computer or computer controlled switching centre performs the functions attributed to the "agent". The term is not necessarily limited to control programs which monitor their environment and adapt their behaviour and response thereto, but encompasses such programs.

Each agent makes use of data, and it is convenient that the agents should therefore operate in "object-oriented" fashion; that is to say, that the data should be "encapsulated" so as to be accessible and alterable only by associated control programs, acting in response to "messages" (which need not, however, be physically transmitted but could simply be data passed via the stack of a single computer). The agents may be defined in an object-oriented model such as Object Management Group's Common Object Request Broke Architecture (CORBA). It will, however, be understood that the object oriented format is inessential to the invention.

Figure 3:
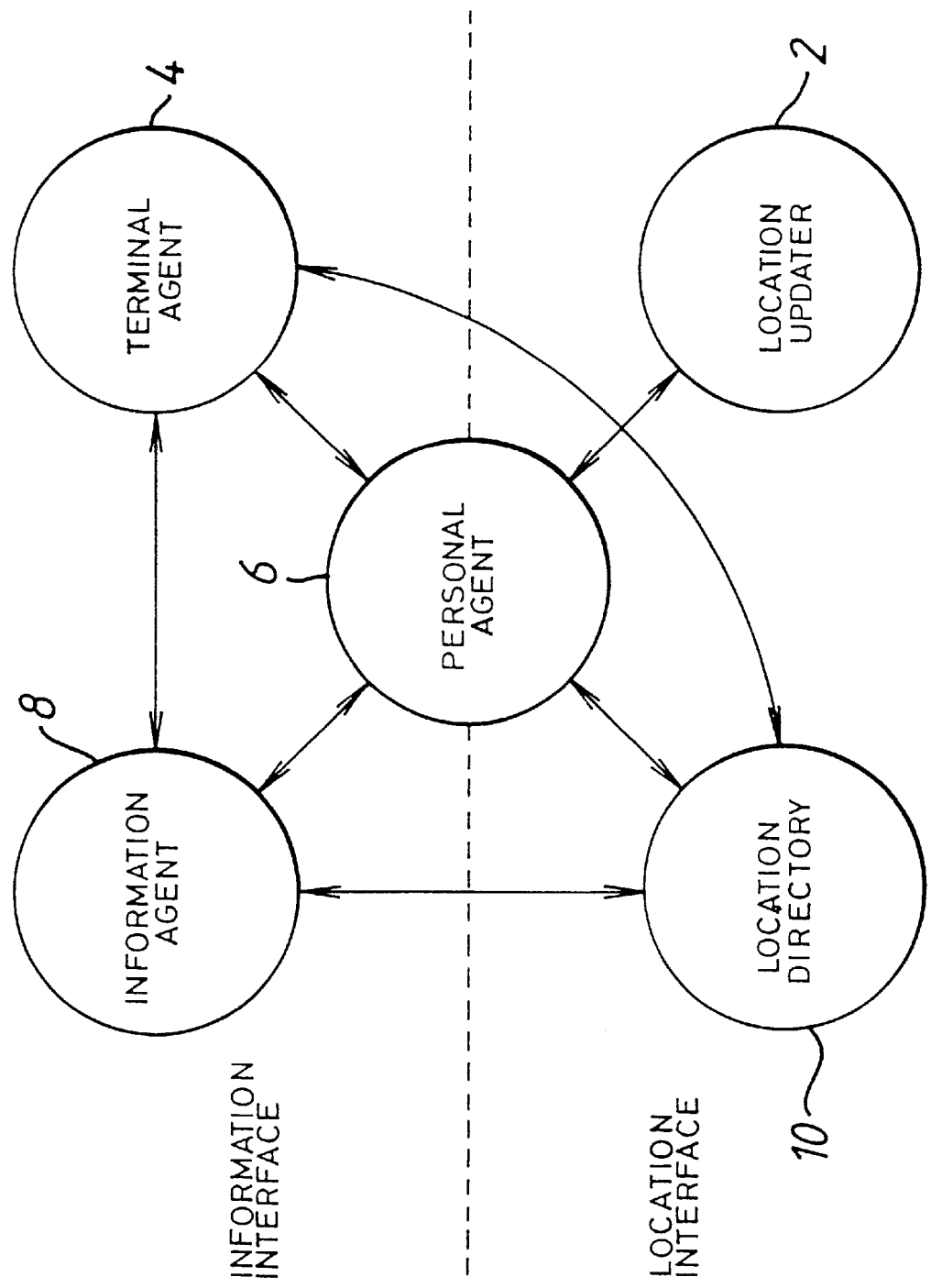
FIG. 3 is a schematic diagram illustrating the system architecture for control programs used in the apparatus of the present invention.

Referring to FIG. 3, the software architecture of the system includes a location updater object class 2, a terminal agent object class 4, a personal agent object class 6, an information agent object class 8 and a location directory object class 10.

Each user in the system has a personal agent 6 operating in the system on its behalf. Each information source in the system has an information agent 8 operating in the system on its behalf. Each location update device in the system has a location updater object operating in the system on its behalf. Each terminal in the system has a terminal agent operating in the system on its behalf. Finally, each location directory store has a location directory object operating on its behalf.

Thus, in a single region of the telecommunications system, there will be held a large number of personal agents 6, corresponding with the number of users in the region, a large number of terminal agents 4, corresponding with the number of terminals in the region, a large number of location updaters 2 representing each location update device in the region, and a location directory object representing the regional location directory store.

Each agent has a section of random access memory storing its software code. The relative locations of the agents within the system is not critical, since the agents are accessible by means of the networks N1–N4. However, in an advantageous arrangement, at least some of the terminal agents 4 may be located on file servers close to the respective terminals they represent, the location updaters may be held on a file server at the point of receipt of the location updating information, the information agents 8 may be located on file servers close to the respective information sources they represent, and the personal agents may be held in the regional server which is co-located with the regional location directory store.

Each personal agent has fields for storing the following data:

1. Its user's preference data, including age, gender, state of health, friends, interests, information format type preferences, dynamic update preferences, location-based preferences, time/date-based preferences etc.
2. A location service list detailing information sources and terminals offering service in the current location of the user.
3. A shortlist of selected information sources for presentation to the user.

4. Network addresses of the users personal terminals.
5. The identity of the terminal currently being used by the user.
6. The current location of the user.
7. An alternative location of interest to the user.
8. The network address of the personal agent.
9. A selection algorithm for filtering information by reference to the store of user preference data.

The personal agent 6 interfaces with each of the location service directory 10, information agents 8, terminal agents 4 and location updaters as will be described below.

The information agent has fields for containing the following data:
1. Meta-information concerning the information stored in the information source, including a list of the files contained in the information source, format identifiers (for example Multipurpose Internet Multimedia Extension (MIME) records), the sizes of the files, the language (for example English) of a text file, encoding identifiers, a best before date and a priority indication indicating the relative importance of the respective files in the information source.
2. The network address of the information source.

The terminal agent 4 has fields for containing the following data:
1. A list of allowable input and output file formats.
2. The network address of the terminal.
3. The network address of the personal agent of the current terminal user.
4. A shortlist of information source details sent to the terminal by the current personal agent.
5. The network address of the currently selected information source, if any.
6. A list of file format translations which the terminal agent supports.

The location updater 2 has fields for containing the following data:
1. The current location of the corresponding location update device.
2. The identities of users being serviced by the location updater (multiple users if the location update device is fixed, single user if the location update device is mobile).

The location directory 10 has fields for containing the following data:
1. A full list of information source descriptions for all information sources providing information relating to the region.
2. A full list of terminal agents providing terminal resources in the region.
3. A list of all personal agents operating in the region, with their current locations.

The information source descriptions contained in the location directory include the following:
1. The name of information source.
2. A summary of the contents of the information source.
3. The network address of the information source.
4. A locality record for the information source.

The terminal records held in the location directory 10 include the following:
1. The network address of the terminal.
2. A locality record for the terminal.

The locality records held in the location directory relating to the information sources and the terminal agents define the following location characteristics, namely a location defined in latitude, longitude and altitude, and a three-dimensional shape defining the locality in which the record is valid, with the defined location at the centre of three-dimensional shape.

Localities with which respective information sources are associated are individually configurable. Some information (for example weather information) could therefore be readily accessible by the user over a relatively wide area, whereas other information, being more location-specific (such as local services information), could be filtered out except in a more narrowly-defined locality.

Location Updating

Figure 4:
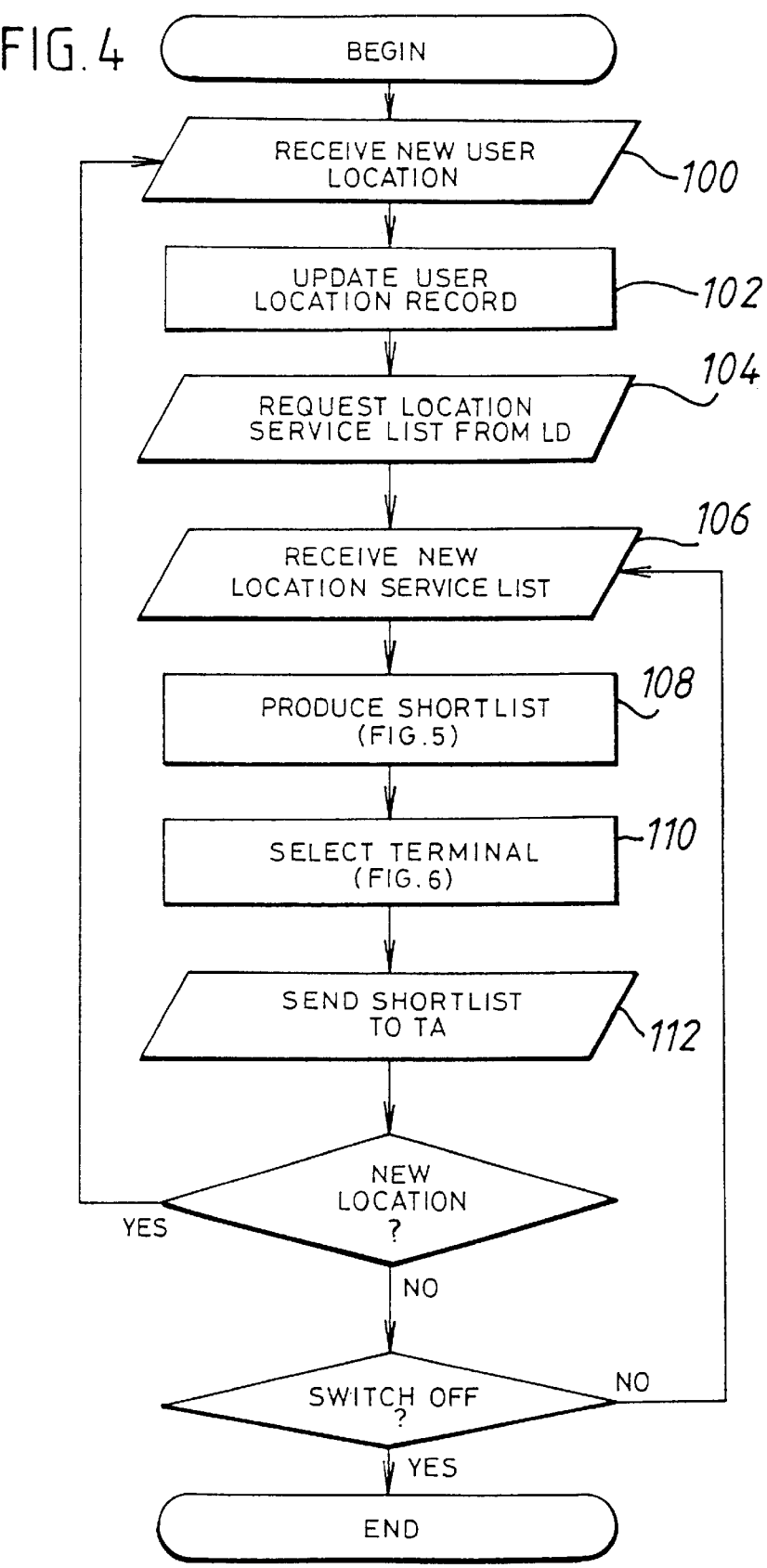
FIG. 4 is a flow diagram illustrating a location updating procedure.

Referring to FIG. 4, the location updater 2 provides a location update message, in the case of a fixed location updater when a user registers with the location updater, and in the case of a mobile location updater when the user carrying the location updater moves a predefined threshold distance since a previous location update.

When the personal agent receives a new location for the user, due to location updating or due to the user logging onto a terminal, the personal agent updates its user location record, step 102, and proceeds to request a new location service list from the location directory, step 104.

On receipt of a location service list request, the location directory performs a search for geographical intersections between the stored terminal locality records and the stored information source locality records with the user location specified in the location service list request, and produces a location service list providing information source descriptions of all information sources associated with the location of the user, and terminal descriptions of all terminals having a locality associated with that of the user. The information source description contains the name of the information source, a summary of its contents, its address and its locality record. The terminal description includes the network address of the terminal.

When compiled, the location service list is sent to the personal agent, which receives it in step 106. From the list, the personal agent is able to produce a shortlist of information sources, step 108, and select an appropriate terminal for receipt of information by the user, step 110, as described in further detail below.

When the terminal has been selected, the personal agent sends the shortlist information to the terminal agent of the selected terminal, step 112.

At this point, the user is able to access information detailed on the shortlist, which remains valid as long as the user remains in the same location. When the user moves to a new location, the personal agent receives a new user location from the location updater in question, and returns to step 100.

It should be mentioned that a location may not necessarily be a geographical location. For example, it may be appropriate to assign a particular location to a means of transport, such as a train, thus allowing the personal agent of a user to select information which it considers may be of interest to its user when boarded. Such information could for example be travel connection information.

Where a location is a geographical location, the type of information selected by a personal agent may be information pertaining to services in the local area, other users (friends) in the local area (in this sense, personal agents may also act as information agents by registering their respective information with the location directory for distribution to interested parties in the same locality), local tourist information, etc.

Shortlisting Information Sources

Figure 5:
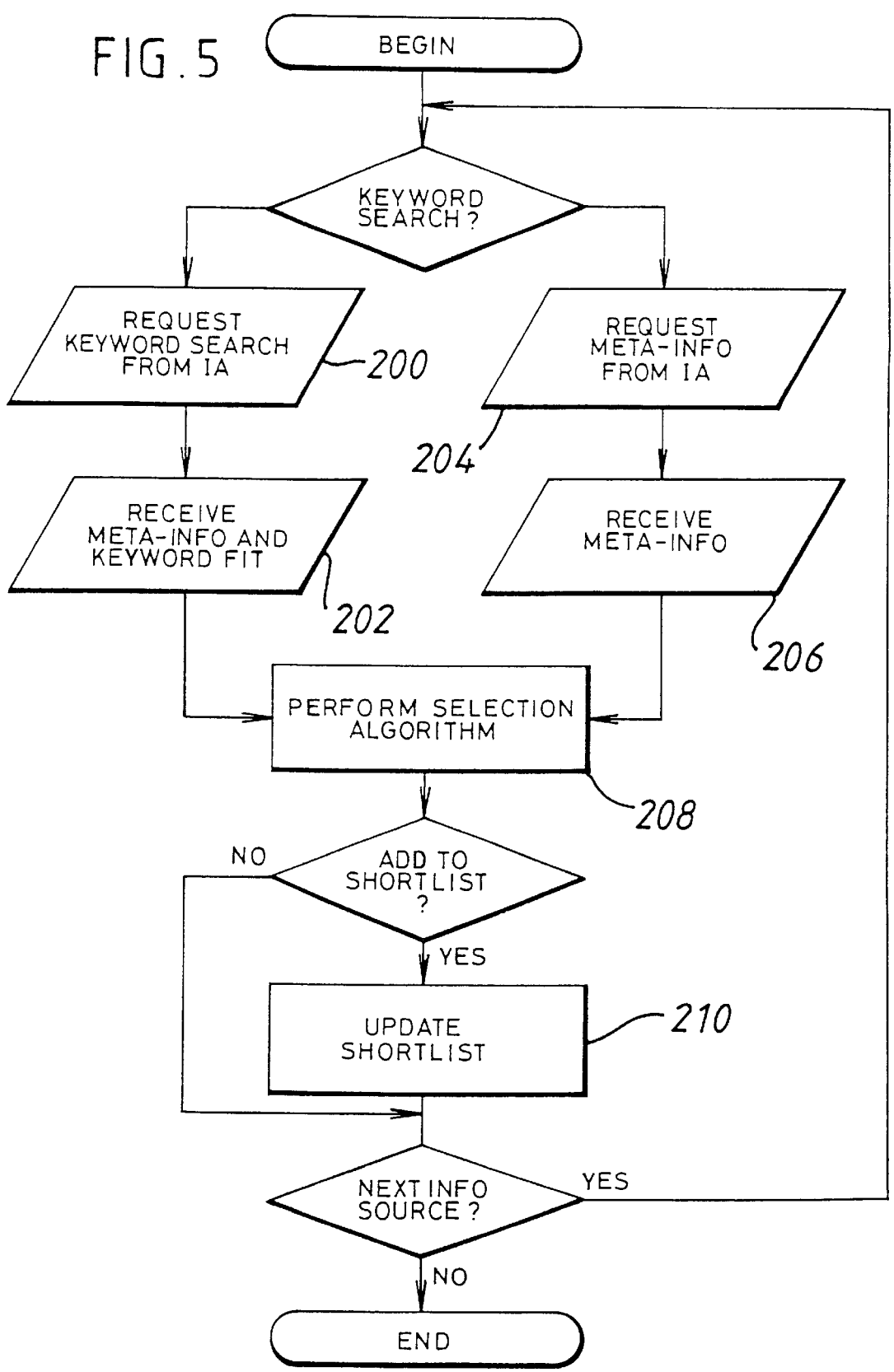
FIG. 5 is a flow diagram illustrating a shortlisting procedure.
Figure 6:
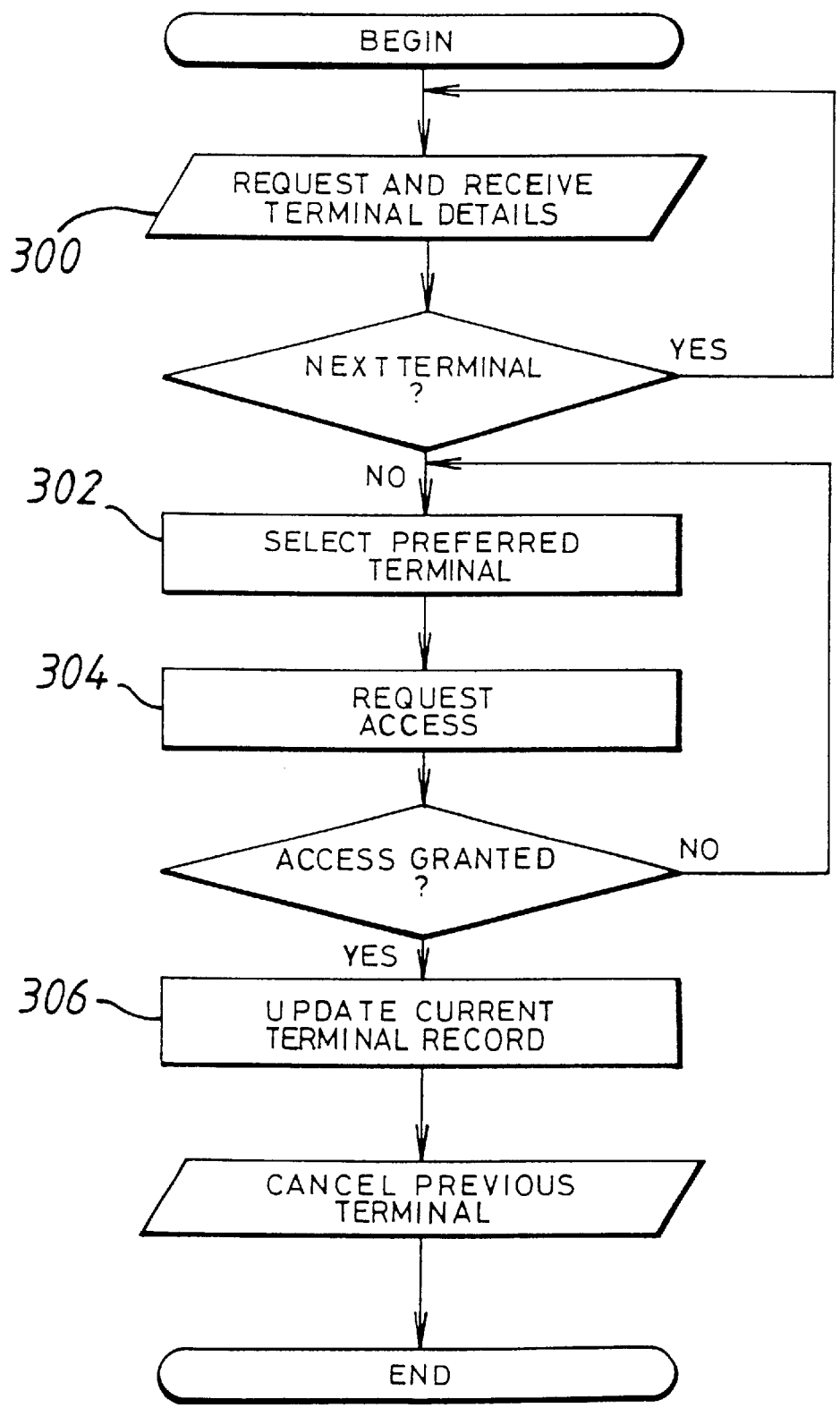
FIG. 6 is a flow diagram illustrating a terminal selection procedure.

When a personal agent has received a new location service list, the personal agent proceeds to filter out information sources which it considers not potentially of interest to its user. This is carried out as shown in FIG. 5.

The personal agent first selects one of the information sources in the location service list, and checks whether the summary of the information source contents correspond with any of the users preferences. From the summary, the personal agent determines whether a key word search is appropriate. If so, the personal agent requests a key word search to be performed by the corresponding information agent, step 200. The information agent performs a search of the information source contents to determine a fit factor of the contents held and the key words. The personal agent then receives meta-information relating to the information stored and the key word fit results from the information agent, step 202.

If no key word search is required, the personal agent simply requests meta-information from the information agent, step 204, and duly receives it, step 206.

With or without the key word fit, the personal agent performs the stored selection algorithm, using the stored user preferences and the information stored relating to the information source being accessed, 208. Should the selection result indicate an information source containing information Potentially of interest to the user in the user's current location, the personal agent adds the information source details to its shortlist, step 210.

The personal agent proceeds to perform the same sequence of procedures in relation to each information source listed in the location service list, until such time as all information sources associated with the location of the user have been analysed, and all information sources containing information which is potentially of interest to the user have been added to the shortlist.

Terminal Selection

Once the shortlist has been constructed, the personal agent proceeds to request terminal details from the terminal agents of each of the terminals listed in the location service list, step 300.

The terminal details received include details of the information format types (for example text files, audio files, image files) supported by the terminal. This is compared by the personal agent with the meta-information of all items on the shortlist, and user terminal-type preferences are taken into account, in order to select a preferred terminal for receipt of information by the user, 302.

The selected terminal may either be one of the user's personal terminals, or a public terminal which is in the vicinity of the user at the current user location.

Once a terminal is selected, the personal agent contacts the corresponding terminal agent and requests access to the terminal, 304. Should the terminal agent grant access, the current terminal record of the personal agent is updated, 306. Otherwise, a different terminal must be selected.

If the terminal to which access is granted is different to the previously selected terminal, the personal agent sends a cancel terminal command to the terminal agent of the previous terminal, step 308.

File Transmission

When the terminal agent of the selected terminal has received the shortlist from the personal agent, the terminal agent sends the summary details of all shortlisted information sources to the terminal for receipt by the user.

The user may be directed to a newly-selected terminal by a message received for example on the user's personal mobile terminal T1 or T2.

When viewing or otherwise receiving the shortlist, the user is able to select one of the shortlisted information sources, which causes the terminal agent to request a file directly from the selected information source.

The terminal agent also sends data to the personal agent identifying the selected file, to allow the personal agent to refine the stored user preference information by a learning process, such as by means of a genetic algorithln, and for billing purposes. Each personal agent may periodically report use of the services available to a billing system for billing purposes.

Figure 7:
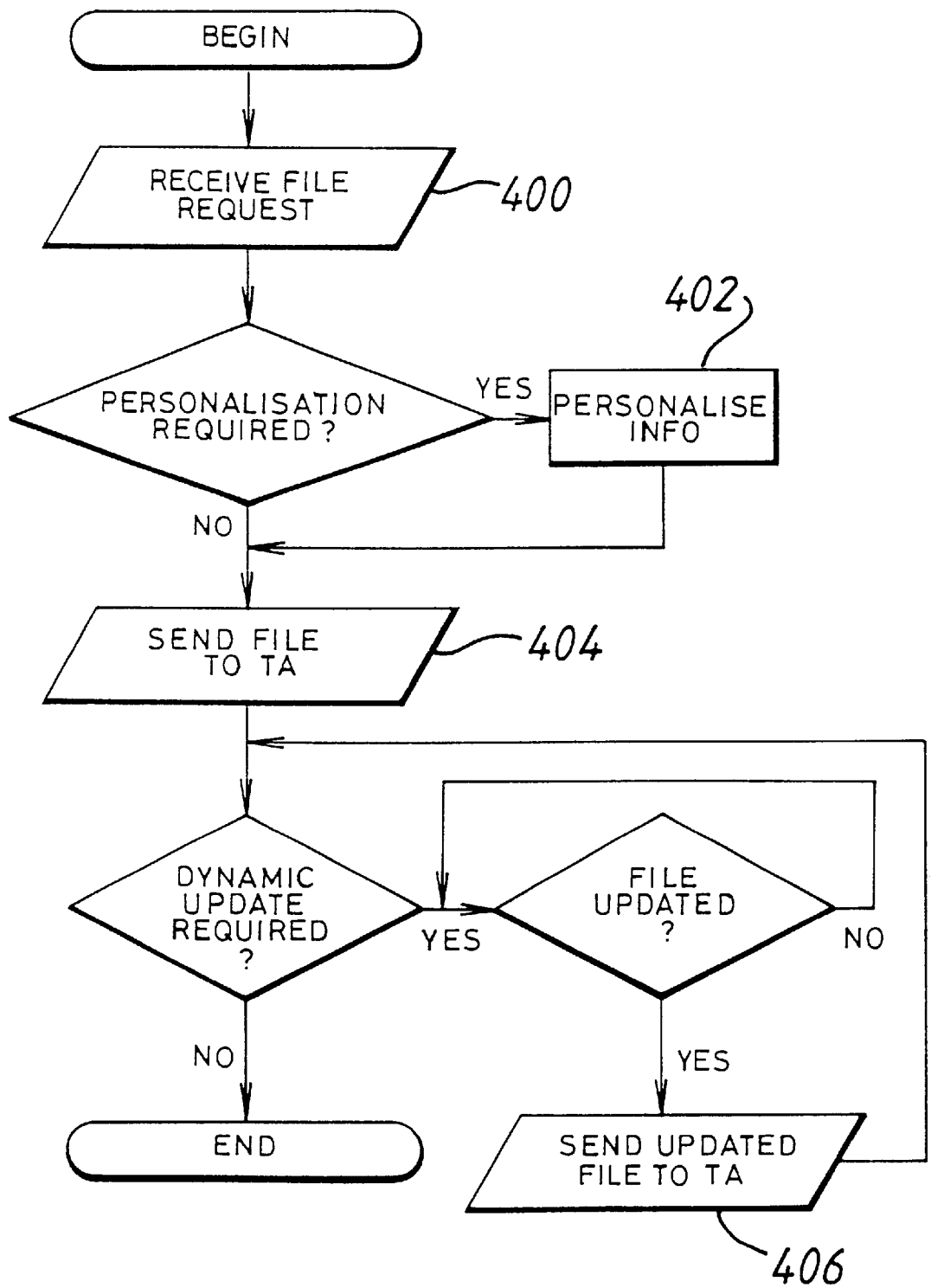
FIG. 7 is a flow diagram illustrating a procedure whereby a user selects information for delivery.

Referring to FIG. 7, when the information agent receives a file request, step 400, it checks the request to determine whether the terminal agent has requested personalisation of the file contents. The user may for example request only a portion of the file contents to be sent, or that content of a particular type be sent. If personalisation is required, the information agent proceeds to personalise the file contents, step 402.

When the personalised or unpersonalised file is then sent to the terminal agent, step 404, the terminal agent determines whether format conversion is required or desired. Such format conversion may be performed by resources in the system and may consist of any of the following format conversions (but the following is not intended to be a limiting list):

- 3D graphics to 2D graphics and vice versa;
- Image graphics to facsimile and vice versa;
- Facsimile to text (e.g. optical character recognition) and vice versa;
- First application output (e.g. spreadsheet) to second application output (e.g. wordprocessor);
- Wordprocessor output to text and vice versa;
- Text to speech and vice versa (speech recognition);
- First video format to second video format (e.g. full rate video to MPEG compressed video);
- Text to summary (i.e. automatic document abstracting);
- Picture to text (i.e. image recognition);
- First human language to second human language (i.e. machine translation);
- First speech coder format to second speech coder format (e.g. ADPCM to GSM and vice versa);
- First database search query language to second database search query language.

The request from the terminal agent to the information agent will contain an indication of whether or not dynamic updating of the information received from the information agent is required. If so, whenever the requested file is updated in the information source, providing the user remains in the locality associated with the information source, the file is re-sent to the terminal agent, step 406.

The information agent is able to determine each of the users interested in the information stored in the information source since the location directory stores a full list of the current user locations. Thus, whenever an information source is updated, the corresponding information agent checks, for all users for whom dynamic updates were requested, in the location directory to determine whether or not the user remains within its associated locality before the new file is sent.

Mobile Information Sources

As briefly mentioned above personal agents may also register information for distribution to other users in its locality, with the location service directory. These users are mobile, and therefore the personal agents act as mobile information agents which may cause the updating of a user's shortlist, for example when the mobile personal agent providing the information is a friend of the user in question, even when the user remains stationary. Similarly, other information sources may be mobile and also cause such dynamic updating of a user's information source shortlist.

Locating Agents

The address of mobile agents within the system may not be available in a given region (for example, the personal agent of a user will not be held in the regional server when a user has newly location-updated in the region). For this reason, a locating server resource LS (see FIG. 2) is provided in the system which maintains current network address data for all mobile agents in the system. Thus, a "lost" agent may always be contacted via the locating server resource.

Location-dependent Preferences

It has been pointed out that user preferences may also be location-dependent. Accordingly, the stored preferences may indicate that when a user is located within a business environment, the user would prefer to receive business-related information. The location of the business environment would be stored in the personal preference list. Similarly, when the user is in a shopping centre, the user may prefer to receive information relating to the goods on offer at that shopping centre, whereas the user would otherwise not be interested in such information.

Other Aspects of the Invention

Terminals

Particular terminals have been discussed above as examples. A more complete (though non limiting) list would include:

telephones,
video cameras,
3D displays,
personal digital assistants,
cellular telephones,
satellite telephones,
pagers,
video phones,
facsimiles,
payphones,
quertyphones,
personal computers,
lap top portable computers,
engineering workstations,
audio microphones,
video conference suites,
telemetry equipment.

Network and Links

Likewise, although examples of networks have been given the range of network links available includes:

terrestrial cellular networks (analog or digital),
callpoint wireless systems,
microcellular or picocellular systems,
satellite cellular systems,
the Internet,
packet switching data services (PSS),
leased lines,
the PSTN,
optical networks,
Ethernet or the like area networks,
line of sight infrared links,
video to home links,
radio paging networks.

User Location

Whilst particular techniques for location tracking have been described, it will of course be understood that any method of tracking the approximate user position may be used; for example, tracking the terminals at which a user logs on. Accordingly, although it is preferred no specific position tracking device is essential to the invention.

Information Sources

It is to be appreciated that the information sources referred to herein are not necessarily held on separate network nodes. They may be held on a single server. It is preferred that the sources hold multi-media information. As an example, the sources may include World Wide Web pages which are individually accessible via a system address in the form of a Uniform Resource Locator (URL) via an Internet Connection.

What is claimed is:

1. A method of selecting information sources from which information is provided to users via a telecommunications system, said method comprising:

tracking the location of a user in the system by receipt of tracking information for said user;

accessing location data indicating localities in which information from the respective sources is deemed to be relevant;

generating a shortlist of information sources for said user on the basis of said tracking information and said location data; and transmitting said shortlist to a terminal associated with said user so as to allow said user to select an information source of interest and thereby to access information from said source.

2. A method according to claim 1, comprising storing localities with which the respective information sources are associated, said generating step comprising determining intersections between said localities and the location of the user.

3. A method according to claim 2, comprising configuring said localities individually.

4. A method according to claim 1, comprising altering the shortlists of information sources of a user when said user is in a locality with which an information source is newly associated.

5. A method according to claim 4, wherein said newly associated information source relates to a mobile user in said system.

6. A method according to claim 1, comprising selecting said associated terminal on the basis of said tracking information.

7. A method according to claim 1, comprising determining the information formats accepted by terminals in said telecommunications system and selecting said associated terminal on the basis that the terminal accepts the format of information provided by a source present in said shortlist.

8. A method according to claim 1, comprising storing preference information associated with a user, and analysing information sources which are associated with the location of the user in order to select from those analysed information sources ones containing information which is likely to be of interest to the user, for placement on said shortlist.

9. A method according to claim 8, wherein said preference information includes at least some of the following: age, gender, state of health, friends, interests, information format type preferences, dynamic update preferences, location-based preferences, and time and date-based preferences.

10. A method according to claim 1, wherein said shortlist includes system address data whereby the sources may be identified in said telecommunications system.

11. A method according to claim 1, comprising receiving said tracking information from a location updating device in said system.

12. A method according to claim 1, wherein different information sources which are associated with the same location are stored in servers distributed within said system.

13. A method according to claim 1, wherein said information sources include personal information sources containing information relating to users of the system.

14. A method according to claim 1, wherein said information sources include sources containing terminal-specific information to be retrieved by a user at one or more prespecified terminals.

15. A method according to claim 1, wherein said information sources include sources containing information relating to services available in the locality in which the information items are to be distributed.

16. A method according to claim 1, wherein said information sources comprise all or any of text files, image files, sound files, speech data files and/or video files.

17. A method according to claim 1, further comprising personalising the content of information provided by at least one of said refined selection of information sources, for said user.

18. A method according to claim 1, including a step of monitoring changes in the tracking information and performing said generating step in response to a change in the tracking information.

19. A method according to claim 1, further including detecting when a user requires information relating to a new location.

20. A method according to claim 1, wherein said shortlist includes summary information for each of the information sources therein.

21. Apparatus for generating a shortlist of information sources from which information can be provided to one or more users in a telecommunications system, said apparatus comprising:
  i) location storage means arranged to store location data indicating localities in which information from the respective sources is deemed to be relevant;
  ii) receiving means arranged to receive a signal indicative of a detected location of a user;
  iii) location-dependent selection means arranged to:
    a. identify, from said information sources, a plurality of information sources on the basis of the detected location of the user and said location data;
    b. identify selectable access data corresponding to the identified information sources, the access data enabling access to the identified information sources;
    c. generate a shortlist of said identified information sources, the shortlist comprising access data corresponding thereto; and
  (iv) transmitting means for transmitting the shortlist to a terminal in said telecommunications system for selection therefrom by a user.

22. Apparatus according to claim 21, wherein said location data specifies geographical coordinates of localities for which the related information sources contain relevant information.

23. Apparatus according to claim 21, wherein said information sources are held on a plurality of servers distributed within said telecommunications system, said selection means being arranged to select information sources from more than one of said servers for a user in a particular location.

24. Apparatus according to claim 21, comprising means for allowing a user to select from the shortlist, for transmission of information from said selection means to said terminal.

25. Apparatus according to claim 21 further comprising means for storing data identifying the locations of terminals in said telecommunications system and means for selecting one of said terminals on the basis that the terminal is in the proximity of a user.

26. Apparatus according to claim 21, comprising means for analysing information sources which are associated with the location of the user in order to further identify from those analysed information sources ones which contain information which is likely to be of interest to the user, on the basis of preference information associated with said user.

27. Apparatus according to claim 26, further comprising means for altering said preference information in response to learning of selections of information sources made by a user.

28. Apparatus according to claim 21, wherein said location storage means holds system address data whereby the information sources may be accessed in said telecommunications system.

29. Apparatus according to claim 21, comprising storage means holding user location data indicating the locations of users in the system.

30. Apparatus according to claim 21, wherein said information sources include personal information relating to users of the system.

31. Apparatus according to claim 21, wherein said information sources include terminal-specific information to be retrieved by a user at one or more prespecified terminals.

32. Apparatus according to claim 21, further including means operable to monitor changes in the detected location of the user, wherein said location dependent selection means is arranged to generate said shortlist in response to a change in the detected location.

33. A method of selecting information sources from which information is provided to users via a telecommunications system, said method comprising:
  tracking the location of a user in the system by receipt of tracking information for said user;
  accessing location data defining localities in which information from the respective sources is deemed to be relevant;
  selecting a plurality of information sources on the basis of intersections between said location and said localities;
  filtering said selected information sources on the basis of preference data indicating preferences expressed by said user to provide a refined selection of information sources having contents which are likely to be of interest to said user; and generating a shortlist of said filtered information sources, the shortlist permitting selection of at least one of the refined selection of information sources by the user.

34. A system for providing one or more users in a telecommunications system with a shortlist of information sources from which information can be selected by the or each user, the system including an apparatus for generating said shortlist of information sources according to claim 21; and location detecting means for detecting the location of the user, wherein the receiving means is arranged to receive a signal indicative of a detected location of a user from said location detecting means.

35. A system according to claim 34, wherein said location detecting means includes a location updating means to be carried by the or each user.

36. A system according to claim 35, wherein the location updating means comprises a positioning receiver, such as a GPS receiver.

37. A system according to claim 35, wherein the location updating means comprises a user identity module for identifying the user to a receiver means located in the proximity of the user.

38. A method of selecting information sources from which information is provided to users via a telecommunications system, said method comprising:

tracking the location of a first user in the system by receipt of tracking information for said first user;

accessing location data indicating localities in which information from the respective sources is deemed to be relevant;

generating a shortlist of information sources for a second user on the basis of said tracking information and said location data in respect of the first user; and transmitting said shortlist to a terminal associated with the second user so as to allow said second user to select an information source of interest and thereby to access information from said source.

39. A method according to claim 38, in which the second user is stationary.

40. A method according to claim 38, comprising altering the shortlist of information sources when said first user is in a locality with which an information source is newly associated.

41. A method according to claim 38, comprising determining the information formats accepted by terminals associated with the second user and selecting said associated terminal on the basis that the terminal accepts the format of information provided by a source present in said shortlist.

42. A method according to claim 38, comprising storing preference information associated with the second user, and analyzing information sources which are associated with the location of the first user in order to select from those analyzed information sources ones containing information which is likely to be of interest to the second user, for placement on said shortlist.

43. A method of selecting information sources from which information is provided to users via a telecommunications system, said method comprising:

tracking whether a user has boarded a mode of transportation by receipt of tracking information for said user;

accessing data in which information from the respective sources is deemed to be relevant to the mode of transportation;

generating a shortlist of information sources for said user on the basis of said tracking information and whether a user has boarded a mode of transportation; and transmitting said shortlist to a terminal associated with said user so as to allow said user to select an information source of interest and thereby to access information from said source.

44. A method according to claim 43, wherein the information from said source is related to travel connection information.

\* \* \* \* \*

(12) EX PARTE REEXAMINATION CERTIFICATE (9693rd)
United States Patent
Titmuss et al.

(10) Number: US 6,397,040 C1
(45) Certificate Issued: Jun. 4, 2013

(54) TELECOMMUNICATIONS APPARATUS AND METHOD

(75) Inventors: Richard John Titmuss, Ipswich (GB); Katherin Margaret Allen, Ipswich (GB); Caroline Anne Michele Lebre, Ipswich (GB); Robert Peter Moore, Suffolk (GB)

(73) Assignee: British Telecommunications Public Limited Company, London (GB)

Reexamination Request:
No. 90/012,471, Sep. 6, 2012

Reexamination Certificate for:
Patent No.: 6,397,040
Issued: May 28, 2002
Appl. No.: 09/125,708
Filed: Aug. 25, 1998

(21) Appl. No.: 90/012,471

(22) PCT Filed: Apr. 9, 1998

(86) PCT No.: PCT/GB98/01056
§ 371 (c)(1),
(2), (4) Date: Aug. 25, 1998

(87) PCT Pub. No.: WO98/47295
PCT Pub. Date: Oct. 27, 1998

(30) Foreign Application Priority Data

Apr. 14, 1997 (GB) .................................. 9707615

(51) Int. Cl.
*H04W 24/00* (2009.01)

(52) U.S. Cl.
USPC ................... 455/67.11; 455/412.2; 455/414.2

(58) Field of Classification Search
CPC ...................................................... H04W 24/00
USPC .................................... 455/67.11, 112, 114.2
See application file for complete search history.

(56) References Cited

To view the complete listing of prior art documents cited during the proceeding for Reexamination Control Number 90/012,471, please refer to the USPTO's public Patent Application Information Retrieval (PAIR) system under the Display References tab.

*Primary Examiner* — Henry N Tran

(57) ABSTRACT

A method of selecting information sources from which information is provided to users via a telecommunications system, the method comprising: tracking the location of a user in the system by receipt of tracking information for the user; accessing location data indicating localities in which information from the respective sources is deemed to be relevant; generating a shortlist of information sources for the user on the basis of the tracking information and the location data; and transmitting the shortlist to a terminal associated with the user so as to allow the user to select an information source of interest and thereby to access information from the source.

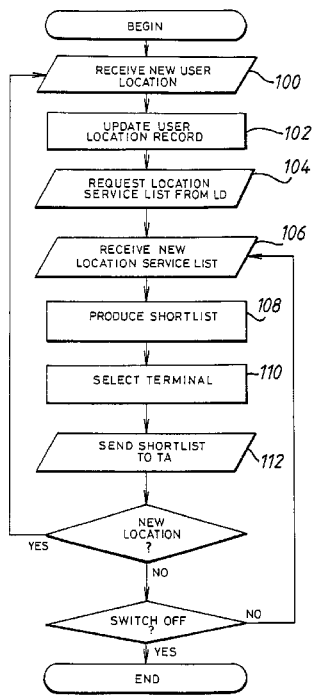

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-44 is confirmed.

* * * * *